United States Patent [19]

Morris et al.

[11] Patent Number: 4,567,572
[45] Date of Patent: Jan. 28, 1986

[54] FAST PARALLEL SORTING PROCESSOR

[75] Inventors: S. Brent Morris, Columbia; Richard A. Wisniewski, West Friendship, both of Md.

[73] Assignee: United States of America, Director, National Security Agency, Washington, D.C.

[21] Appl. No.: 468,423

[22] Filed: Feb. 22, 1983

[51] Int. Cl.[4] .................................................. G06F 7/16
[52] U.S. Cl. .................................... 364/900; 340/146.2
[58] Field of Search ........................................ 340/146.2; 364/200 MS File, 900 MS File

[56] References Cited

U.S. PATENT DOCUMENTS

| | | | |
|---|---|---|---|
| 3,636,519 | 1/1972 | Heath | 364/900 |
| 4,030,077 | 6/1977 | Florence et al. | 364/900 |
| 4,110,837 | 8/1978 | Chen | 364/900 |
| 4,128,880 | 12/1978 | Gray, Jr. | 364/200 |
| 4,302,818 | 11/1981 | Niemann | 364/200 |
| 4,410,960 | 10/1983 | Kasuya | 364/900 |
| 4,425,617 | 1/1984 | Sherwood | 364/900 |
| 4,435,765 | 3/1984 | Uchida et al. | 364/200 |
| 4,464,732 | 8/1984 | Clark | 364/900 |

Primary Examiner—James D. Thomas
Assistant Examiner—Thomas Lee
Attorney, Agent, or Firm—Thomas O. Maser; John R. Utermohle

[57] ABSTRACT

An information processor is described which is especially suitable for efficiently sorting large quantities of binary data. Data in a plurality of storage devices is fed to a plurality of compare-exchange modules and is then selectively passed back to the storage devices by means of multi-input switches. A programmable microprocessor controls passage of data through the various components in an iterative process.

3 Claims, 2 Drawing Figures

FAST PARALLEL SORTING PROCESSOR

BACKGROUND OF THE INVENTION

1. Field of the Invention

Our invention relates to the field of information processing, and more specifically to rapid sorting of information stored in binary form.

2. Description of the Prior Art

Efficient sorting of data is a problem which receives considerable attention in computer science. Two sorting networks in particular have been developed which significantly advanced the state of knowledge in this area. One well known sorting network is a bitonic sorter devised by K. E. Batcher and described in "Sorting Networks and Their Application", *Proc. AFIPS* 1968 *Spring Joint Comp. Conf.;* Vol. 32, AFIPS Press, Montrale, N.J.; pp 307-314. The bitonic sorter requires ($\frac{1}{2}$) $\log_2 N(1+\log_2 N)$ ranks of $N/2$ compare-exchange (CE) modules each to sort $N=2^k$ items of data. The delay, or sorting time, required is ($\frac{1}{2}$) $\log_2 N(1+\log_2 N)$.

H. S. Stone developed a modification of the bitonic sorter in which $N=2^k$ data items could be sorted by a structure having a single rank of N storage registers and a signal rank of N/2 CE modules. This processor is illustrated and described in H. S. Stone, "Parallel Processing with the Perfect Shuffle," *IEEE Trans. Comp.*, Vol. C-20, No. 2, February 1971, pp 153-161. The Stone processor requires a delay of $(\log_2 N)^2 - (\log_2 N) + 1$.

A drawback to Batcher's bitonic sorter is that, once built for a certain list size, it cannot be easily modified to sort longer lists. In addition, unless data is pipelined through the network, most of the CE modules are idle at any given time. Stone's processor requires fewer CE modules, all of which are used simultaneously during processing. However, all of the CE modules are idle for nearly half the total processing time, while data is being rearranged. Stone's processor is also unable to sort longer lists than that for which it was built.

Our invention is a parallel sorting processor which overcomes the above-mentioned limitations.

SUMMARY OF THE INVENTION

It is an object of our invention to provide a parallel sorting processor which overcomes some of the limitations of the prior art.

A further object is to improve the efficiency of sorting processors.

Another object is to provide a sorting processor which is both rapid and efficient.

A still further object is to reduce the number of compare-exchange modules required in a sorting processor.

It is also an object to reduce the compare-exchange module idle time in a sorting processor.

Another object is to provide a sorting processor capable of being easily expanded to sort increased list sizes.

A parallel sorting processor having these and other attributes and advantages would include: a plurality of information storage devices capable of receiving, storing, and passing information to be processed; a plurality of compare-exchange modules, each module having means for receiving information for each of two predetermined storage devices, means for comparing said information, and means for passing said information according to a first predetermined signal; a plurality of switches, each having a plurality of inputs from selected ones of said modules and means for passing information to one of said storage devices according to a second predetermined signal; and a processor connected to each of said storage devices, modules, and switches for controlling the passage of information through said apparatus.

BRIEF DESCRIPTION OF THE DRAWINGS

Our invention may be best understood by reading the description which follows together with the drawings, in which.

DESCRIPTION OF THE PREFERRED EMBODIMENT

Theory of Operation

Figure 1:
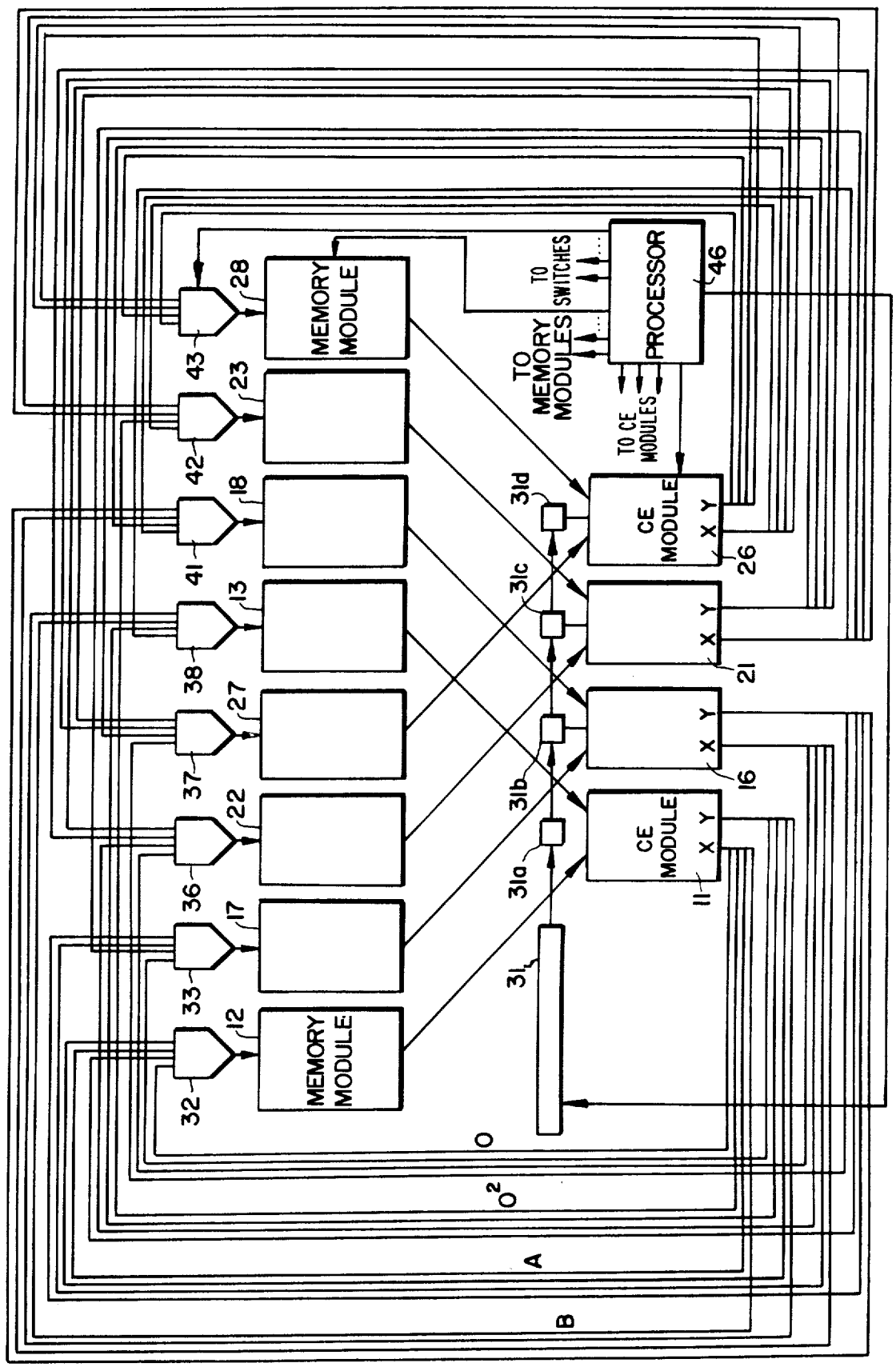
FIG. 1 is a block diagram illustrating the various elements of our invention.

The apparatus developed by Batcher resulted in part from a recognition that sorting of a vector of length $2^v$ is possible if words $2^i$ apart ($0 \leq i \leq v-1$) are compared in an appropriate order. The sequence of comparisons requires the following distances between compared words:

$2^0; 2^1, 2^0; 2^2, 2^1, 2^0; 2^3, 2^2, 2^1, 2^0; \ldots; 2^{v-1}, 2^{v-2}, \ldots, 2^2, 2^1, 2^0.$ Stone developed his apparatus based on the concept that the above comparisons could be made by a device capable of performing the "Faro" or "perfect" shuffle (described in the aforementioned references), with the additional requirement that it be capable of repeated shuffling of the vector while the comparators are idle.

Our invention overcomes the disadvantage of repeated shuffling with a unique switching and multiple interconnection structure. It is capable of sorting a vector of $2^v$ words stored in a memory of $2^k$ modules, each module holding $2^r$ words ($r=v-k$). Data items from Mth memory module are sequentially compared with items from $M+2^{k-1}$th module, where $0 \leq M < 2^{k-1}$. The multiple interconnections determine how the data items are stored back into the memory after they leave the CE modules.

Two basic types of interconnections are required. A first set allows words to be shuffled between the memories by all non-trivial powers of the perfect shuffle. This requires $k-1$ interconnections, which for purposes of this explanation will be designated $0, 0^2, \ldots 0^{k-1}$. If each memory module is considered as holding a vector of data items, the $0^i$ interconnections allow the vectors to be compared component-by-component at all possible powers of two apart.

A second basic type of interconnection is necessary to permit comparison of data items within the same memory module. This category of interconnections includes two subgroups which, for purposes of discussion, will be designated A and B. The A interconnections route both outputs of CE module I to memory module I, for $0 \leq I < 2^{k-1}$. The B interconnections route both outputs of I to $I+2^{k-1}$, also for $0 \leq I < 2^{k-1}$. The word from the X output of the CE module takes the lower-valued location with both the A and B interconnections, as will be explained in greater detail below.

To perform the sort, a series of passes are made through the network. A major pass consists of all $2^v$ words in the memories passing through the CE modules and back to the memories. Each major pass is composed of $2^{v-k}$ minor passes, where a minor pass consists of $2^k$ words, one from each memory module, passing through the network. Either interconnections A and B are used alternatively in a major pass, or the $O^j$ interconnections are used exclusively. When the interconnections A and B are used, they are alternated in groups of $2^i$ minor passes for $0 \leq i \leq v-k-1$. An entire sort requires $\frac{1}{2}v(v+1)$ major passes.

Control of the major and minor passes involves proper selection of the interconnections A, B, O, $O^2$, ... $O^{k-1}$ and control of the CE module outputs. The CE modules must be set during each minor pass. As will be explained below, one setting causes the higher value of the two compared words to be routed to a first output of the CE module while the lower value is routed to the second output. A different setting causes the lower value of the two compared words to be routed to the first output of the CE module while the higher value is routed to the second output. For purposes of explanation, a 0 will represent the first condition and a 1 will represent the second condition. The settings are easily described by use of a $2^{v-1}$ bit long mask register which can be initially filled with either an alternating 0,1 sequence or an all 1's sequence. Between major passes an Out Shuffle (perfect shuffle) is performed on the mask register. For each major pass, the mask register is read off in groups of $2^{k-1}$ bits to control the CE modules during a minor pass.

Our apparatus sorts a vector of $2^v$ words stored in a memory of $2^k$ modules, each holding $2^r$ words, where $r = v - k$. This process is set out below in an ALGOL-like language. The total delay for the sort is $v(v+1)2^{r-1}$, since there are $v(v+1)/2$ major passes each consisting of $2^r$ minor passes. Before giving the procedure, we note that a compare-exchange of the data means that the $W^{th}$ word of modules M and $M + 2^{k-1}$ are compared and exchanged according to the mask register bit. The data is then routed back to the memory modules according to the interconnection specified immediately following the compare-exchange operation.

```
COMMENT: Procedure for sorting 2ᵛ words stored in 2ᵏ memory
modules each initially holding 2ʳ = 2ᵛ⁻ᵏ data items.
START:
CEMASK = Vector (0,1,0,1, . . . 0,1);
For i: = 1 STEP 1 UNTIL k − 1 DO
BEGIN i loop;
Compare-exchange (DATA);
Shuffle 0ᵏ⁻ⁱ (DATA)
IF [(i ≠ k − 1) OR (r = 0)]
THEN CEMASK = Vector (0,1, . . .,0,1)
ELSE Shuffle (CEMASK);
IF [(i = k − 1) AND ( r = 0)]
THEN CEMASK: = Vector (1,1, . . .,1)
FOR j: = 1 STEP 1 UNTIL i DO
BEGIN j loop;
Compare-exchange (DATA);
Shuffle 0 (DATA);
IF [(i ≠ k − 1) OR (r = 0)]
THEN Shuffle (CEMASK);
END j loop;
END i loop;
IF (r = 0) THEN GO TO NEXTPASS2;
IF (r < 2) THEN GO TO NEXTPASS1;
FOR i: = 0 STEP 1 UNTIL r − 2 DO
BEGIN i loop:
Compare-Exchange (DATA);
Shuffle Fᵢ (DATA);
Shuffle (CEMASK);
FOR j: = 1 STEP 1 UNTIL k−1 DO
BEGIN j loop;
Compare-exchange (DATA);
Shuffle 0 (DATA);
END j loop:
FOR j: = 1 STEP 1 UNTIL i+1 DO
BEGIN j loop;
Compare-exchange (DATA);
Shuffle Fᵢ (DATA);
END j loop;
END i loop:
NEXTPASS1:
Compare-exchange (DATA);
Shuffle Fᵣ₋₁ (DATA);
NEXTPASS2:
CEMASK: = Vector (1,1, . . .,1);
FOR i: = 1 STEP 1 UNTIL k − 1 DO
BEGIN i loop;
Compare-exchange (DATA);
Shuffle 0 (DATA);
END i loop;
IF (r = 0) THEN GO TO NEXTPASS3
FOR i: = 1 STEP 1 UNTIL r+1
BEGIN i loop;
Compare-exchange (DATA);
Shuffle Fᵣ₋₁ (DATA);
END i loop;
NEXTPASS3:
IF (r = 0) THEN DO
BEGIN
Compare-exchange (DATA);
Shuffle 0 (DATA);
END;
```

Structure

A preferred embodiment of a sorting processor having the essential elements of our invention is illustrated in FIG. 1. It includes $2^k$ memory modules and $2^{k-1}$ comparison-exchange (CE) modules. For this embodiment it will be assumed that $2^v = 2^5 = 32$ data items will be sorted. The apparatus will include $2^k = 2^3 = 8$ memory modules and $2^{k-1} = 2^2 = 4$ CE modules. Each memory module may be a serial shift register having a minimum of $(2^{v-k})n$ stages, where n is the number of bits in each data word. For this example, n may be defined to be five and all memory modules must have at least 20 stages. As is explained in more detail below, the leftmost half of the memory modules must contain 1.5 times the minimum number of stages as defined above. It will be assumed in the example to be described that the numerical values in the memory modules are the information to be sorted.

Each CE module has two inputs, each of which is the output of a memory module. In the embodiment of FIG. 1, CE module 11 has a first input from the output of memory module 12 and a second input from the output of memory module 13. Similarly, CE module 16 has inputs from memory modules 17 and 18; CE module 21 takes inputs from memory modules 22 and 23; and CE module 26 takes inputs from memory modules 27 and 28. Each CE module has two outputs. A sixteen-stage shift register 31 provides a third "control" input to each of the CE modules; the thirteenth stage 31a of register 31 is connected to CE module 11, the fourteenth stage 31b is connected to 16, the fifteenth stage 31c is connected to CE module 21, and the sixteenth stage 31d is connected to CE module 26. As will be discussed further with respect to FIG. 2, inputs to the CE modules may be switched to either output depending upon whether the input from shift register stages 31a–31d to that module is "0" or "1".

Outputs of the CE modules are connected to inputs of the memory modules via a plurality of switches, with one switch serving as the input source for each memory module. As illustrated in FIG. 1, a switch 32 is connected to the input of memory module 12, switch 33 is connected to memory module 17, switch 36 is connected to memory module 22, switch 37 is connected to memory module 27, switch 38 is connected to memory module 13, switch 41 is connected to memory module 18, switch 42 is connected to memory module 23, and switch 43 is connected to memory module 28. Inputs to the switches determine how the data is stored back into the memory modules after it leaves the CE modules. A programmable processor 46 is provided to preset and control the operation of the apparatus. Processor 46 is used to perform such functions as control of the inputs to the switches, presetting and shifting of the contents of shift register 31, presetting and control of the CE modules, and initially filling and shifting the data in the memory modules. All switches, memory modules, and CE modules would receive inputs from processor 46.

Figure 2:
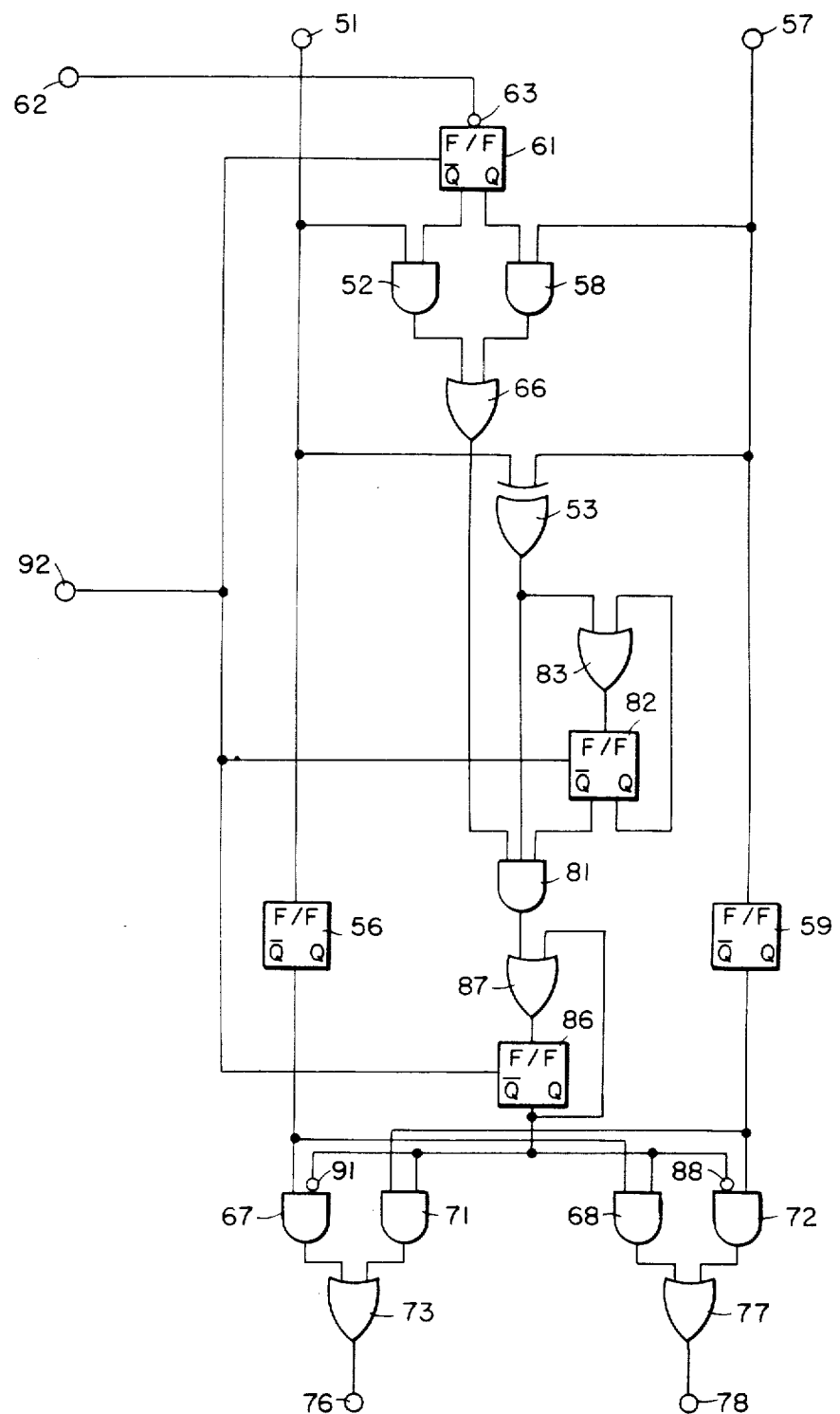
FIG. 2 is a logic block diagram of a CE module.

FIG. 2 illustrates a logic circuit capable of serving as a compare-exchange module 11 in FIG. 1. The circuit includes a first data input terminal 51 connected to an input of an AND gate 52, an Exclusive OR gate 53, and a flip-flop 56. A second data input terminal 57 is similarly connected to an AND gate 58, Exclusive OR gate 53, and a flip-flop 59. A flip-flop 61 has a data input provided from a terminal 62 through an inverter 63. The positive (Q) output of flip-flop 61 is connected to AND gate 58 and the negative ($\overline{Q}$) output of flip-flop 61 is connected to AND gate 52. AND gates 52 and 58 each provide an input to an OR gate 66. The Q output of flip-flop 56 is connected to AND gates 67 and 68, while the Q output of flip-flop 59 connects to AND gates 71 and 72. An OR gate 73 receives inputs from AND gates 67 and 71 and provides an output to terminal 76. An OR gate 77 inputs data from AND gates 68 and 72, and outputs data to terminal 78. An AND gate 81 has three inputs: one from OR gate 66, one from Exclusive-OR gate 53, and one from the $\overline{Q}$ output of a flip-flop 82. The Q output of flip-flop 82 is routed to an OR gate 83, as is the output of Exclusive-OR gate 53. The output of OR gate 83 is connected to the data input of flip-flop 82. A flip-flop 86 receives its data input from an OR gate 87. The Q output of flip-flop flop 86 is provided to a number of gates including: OR gate 87, AND gates 68 and 71, AND gate 72 through an inverter 88, and AND gate 67 through an inverter 91. Each of the flip-flops 61, 82, and 86 may be reset by a signal provided to a terminal 92. The initial values in flip-flops 56 and 59 are not used, so it is not necessary that these elements be reset.

The function of the CE module of FIG. 2 is to compare two binary numbers provided to the input terminals 51 and 57, and to route the numbers to the output terminals 76 and 78. Routing is determined by the signal provided to terminal 62. If the value on terminal 62 is a 0, the numerically larger of the two inputs will be gated to output 76 and the numerically smaller of the two inputs will be gated to output 78. Conversely, if the value on terminal 62 is a 1, the numerically smaller of the two inputs will be gated to the output 76 and the numerically larger of the two inputs will be gated to output 78. A reset signal from processor 46 (FIG. 1) is first provided to terminal 92 to reset the Q outputs of each of the flip-flops 61, 82, and 86 to 0. The $\overline{Q}$ output of each flip-flop is the complement of the Q output, and thus is a 1. The numbers to be compared are next routed from the memory modules to input terminals 51 and 57 serially, with the most significant bit first. Because the Q output of flip-flop 86 is a 0, AND gate 71 will output a 0 and AND gate 67 will output the value of the bit preset in flip-flop 56. Similarly, AND gate 68 will output a 0 and AND gate 72 will output the value of the bit preset in flip-flop 59. So long as the compared bits are the same, either 0 or 1, Exclusive-OR gate 53 will output a 0 and maintain the Q output of flip-flop 86 at 0. Flip-flops 56 and 59 serve as conduits for flow of data from the input terminals 51 and 57 to the output terminals 76 and 78. Their function is to provide a one-bit delay necessary for correct timing.

When the compared bits at terminals 51 and 57 differ, Exclusive-OR gate 53 will output a 1. Because the $\overline{Q}$ output of flip-flop 82 is also a 1, the output of AND gate 81 will be determined by the output of OR gate 66. Let it first be assumed that the terminal 62 is set to 1, indicating that the numerically larger of the numbers on terminals 51 and 57 will be routed through flip-flop 56 to terminal 76. The Q output of flip-flop 61 will remain 0 due to inverter 63. If the bit on terminal 51 is 1, both AND gates 52 and 58 will output a 0 as will OR gate 66. As a result, the 0 in flip-flop 86 will remain unchanged and the data on terminal 51 will flow directly to terminal 76 after a 1-bit delay created by flip-flop 56. Similarly, data on terminal 57 will pass to terminal 78 through flip-flop 59.

If the bit on terminal 57 is a 1, AND gate 58, OR gate 66, and AND gate 81 will each output a 1. The Q output of flip-flops 82 and 86 will each also change to 1. As a result, AND gates 67 and 72 will close and AND gates 71 and 68 will open to allow the information at terminal 57 to pass through flip-flop 59 to terminal 76 while information at terminal 51 passes through flip-flop 56 to terminal 78.

Regardless of whether the 1 first appears at terminal 51 or 57, the 1 on the Q output of flip-flop 82 locks AND gate 81 at 0 and prevents further switching of the AND gates 67, 71, 68, and 72. As a result, a 1 on terminal 62 causes the numerically larger of the values on terminals 51 and 57 to exit through terminal 67 while the smaller value is routed through terminal 78. A similar analysis will establish that a 0 at terminal 62 will cause the numerically larger value to exit through terminal 78 while the smaller value is routed through terminal 76.

EXAMPLE

To illustrate the operation of our invention, let it be assumed that data is initially placed into the memory modules as indicated immediately below. The data order is completely arbitrary and is illustrative only.

| INITIAL ARRANGEMENT OF DATA | | | | | | | |
|---|---|---|---|---|---|---|---|
| 13 | 2 | 17 | 30 | 14 | 15 | 0 | 31 |
| 23 | 19 | 5 | 10 | 6 | 4 | 16 | 28 |
| 3 | 22 | 27 | 18 | 12 | 8 | 24 | 11 |
| 21 | 25 | 9 | 7 | 1 | 26 | 29 | 20 |

Each column above represents the contents of a memory module, with the bottom row representing the data which will first be compared by the CE modules. For the first pass, the shuffle operation is $0^2$ with the mask register containing 0101 0101 0101 0101. For the first minor pass, the data appearing in the first or bottom row of the initial array are compared-exchanged according to the control bits 0101. Thus, the pairs (21,1) (25,26) (9,29) (7,20)

are sent to the comparators. The exchanged pairs according to the control bits (0101) are (21,1) (25,26) (29,9) (7,20)

and produce the intermediate (and unseen) row 21 1 25 26 29 9 7 20, which is then Out Shuffled to give the configuration 21 29 1 9 25 7 26 20.

Note that the shuffle operation specified for this pass is $0^2$. The data lines to the comparators perform one Out Shuffle, hence another Out Shuffle results in the required $0^2$. Gating circuitry controlled by the processor routes these values back to the memory modules and all information within the memory modules is down shifted one position.

| DATA ARRANGEMENT AFTER FIRST MINOR PASS | | | | | | | |
|---|---|---|---|---|---|---|---|
| 21 | 29 | 1 | 9 | 25 | 7 | 26 | 20 |
| 13 | 2 | 5 | 10 | 6 | 4 | 16 | 28 |
| 23 | 19 | 27 | 18 | 12 | 8 | 24 | 11 |
| 3 | 22 | 9 | 7 | 1 | 26 | 29 | 20 |

A similar procedure is performed on the remaining rows of the data to complete major pass number 1.

| DATA ARRANGEMENT AFTER ONE MAJOR PASS | | | | | | | |
|---|---|---|---|---|---|---|---|
| 14 | 17 | 13 | 0 | 2 | 30 | 15 | 31 |
| 23 | 16 | 6 | 5 | 4 | 10 | 19 | 28 |
| 12 | 27 | 3 | 24 | 8 | 11 | 22 | 18 |
| 21 | 29 | 1 | 9 | 25 | 7 | 26 | 20 |

The following table illustrates the complete sorting procedure for the above example. The first array displays the initial arrangement of data in the memory. Each succeeding array represents the memory configuration after performing a major pass. The shuffle operation is given immediately following the pass number, and the content of the mask register is given on the next line as four 4—tuples. Each 4—tuple represents the control bits for the comparators during a minor pass.

TABLE

| INITIAL ARRANGEMENT OF DATA | | | | | | | | PASS NUMBER 1: $0^2$ | | | | | | | |
|---|---|---|---|---|---|---|---|---|---|---|---|---|---|---|---|
| | | | | | | | | 0101 | | 0101 | | 0101 | | 0101 | |
| 13 | 2 | 17 | 30 | 14 | 15 | 0 | 31 | 14 | 17 | 13 | 0 | 2 | 30 | 15 | 31 |
| 23 | 19 | 5 | 10 | 6 | 4 | 16 | 28 | 23 | 16 | 6 | 5 | 4 | 10 | 19 | 28 |
| 3 | 22 | 27 | 18 | 12 | 8 | 24 | 11 | 12 | 27 | 3 | 24 | 8 | 11 | 22 | 18 |
| 21 | 25 | 9 | 7 | 1 | 26 | 29 | 20 | 21 | 29 | 1 | 9 | 25 | 7 | 26 | 20 |
| PASS NUMBER 2: 0 | | | | | | | | PASS NUMBER 3: 0 | | | | | | | |
| 0101 | | 0101 | | 0101 | | 0101 | | 0011 | | 0011 | | 0011 | | 0011 | |
| 14 | 2 | 17 | 30 | 15 | 13 | 0 | 31 | 15 | 14 | 13 | 2 | 0 | 17 | 30 | 31 |
| 23 | 4 | 10 | 16 | 19 | 6 | 5 | 28 | 23 | 19 | 6 | 4 | 5 | 10 | 16 | 28 |
| 12 | 8 | 11 | 27 | 22 | 3 | 18 | 24 | 22 | 12 | 8 | 3 | 11 | 18 | 24 | 27 |
| 25 | 21 | 7 | 29 | 26 | 1 | 9 | 20 | 26 | 25 | 21 | 1 | 7 | 9 | 20 | 29 |
| PASS NUMBER 4: 0 | | | | | | | | PASS NUMBER 5: 0 | | | | | | | |
| 0000 | | 1111 | | 0000 | | 1111 | | 0000 | | 1111 | | 0000 | | 1111 | |
| 0 | 15 | 14 | 17 | 13 | 30 | 2 | 31 | 0 | 13 | 15 | 30 | 2 | 14 | 17 | 31 |
| 23 | 5 | 19 | 10 | 16 | 6 | 28 | 4 | 23 | 16 | 6 | 5 | 28 | 19 | 10 | 4 |
| 11 | 22 | 12 | 18 | 8 | 24 | 3 | 27 | 8 | 11 | 22 | 24 | 3 | 12 | 18 | 27 |
| 26 | 7 | 25 | 9 | 21 | 20 | 29 | 1 | 26 | 21 | 20 | 7 | 29 | 25 | 9 | 1 |
| PASS NUMBER 6: $F_0$ | | | | | | | | PASS NUMBER 7: 0 | | | | | | | |
| 0000 | | 1111 | | 0000 | | 1111 | | 0000 | | 0000 | | 1111 | | 1111 | |
| 23 | 16 | 6 | 4 | 2 | 14 | 17 | 31 | 2 | 23 | 14 | 16 | 6 | 17 | 4 | 31 |
| 28 | 19 | 10 | 5 | 0 | 13 | 15 | 30 | 0 | 28 | 13 | 19 | 10 | 15 | 5 | 30 |
| 26 | 21 | 9 | 1 | 8 | 12 | 22 | 27 | 26 | 8 | 21 | 12 | 22 | 9 | 27 | 1 |
| 29 | 25 | 20 | 7 | 3 | 11 | 18 | 24 | 29 | 3 | 25 | 11 | 20 | 18 | 24 | 7 |
| PASS NUMBER 8: 0 | | | | | | | | PASS NUMBER 9: $F_0$ | | | | | | | |
| 0000 | | 0000 | | 1111 | | 1111 | | 0000 | | 0000 | | 1111 | | 1111 | |
| 2 | 6 | 17 | 23 | 4 | 14 | 16 | 31 | 5 | 13 | 19 | 30 | 4 | 14 | 17 | 31 |
| 0 | 10 | 15 | 28 | 5 | 13 | 19 | 30 | 0 | 10 | 15 | 28 | 2 | 6 | 16 | 23 |
| 26 | 22 | 9 | 8 | 27 | 21 | 12 | 1 | 25 | 20 | 11 | 3 | 26 | 21 | 9 | 1 |
| 29 | 20 | 18 | 3 | 25 | 24 | 11 | 7 | 29 | 24 | 18 | 7 | 27 | 22 | 12 | 8 |
| PASS NUMBER 10: $F_1$ | | | | | | | | PASS NUMBER 11: 0 | | | | | | | |
| 0000 | | 0000 | | 1111 | | 1111 | | 1111 | | 1111 | | 1111 | | 1111 | |
| 25 | 20 | 9 | 1 | 5 | 14 | 19 | 31 | 5 | 25 | 14 | 20 | 9 | 19 | 1 | 31 |
| 26 | 21 | 11 | 3 | 4 | 13 | 17 | 30 | 4 | 26 | 13 | 21 | 11 | 17 | 3 | 30 |
| 27 | 22 | 12 | 7 | 2 | 10 | 16 | 28 | 2 | 27 | 10 | 22 | 12 | 16 | 7 | 28 |
| 29 | 24 | 18 | 8 | 0 | 6 | 15 | 23 | 0 | 29 | 6 | 24 | 15 | 18 | 8 | 23 |
| PASS NUMBER 12: 0 | | | | | | | | PASS NUMBER 13: $F_1$ | | | | | | | |
| 1111 | | 1111 | | 1111 | | 1111 | | 1111 | | 1111 | | 1111 | | 1111 | |
| 5 | 9 | 19 | 25 | 1 | 14 | 20 | 31 | 7 | 12 | 22 | 28 | 5 | 14 | 20 | 31 |
| 4 | 11 | 17 | 26 | 3 | 13 | 21 | 30 | 2 | 10 | 16 | 27 | 1 | 9 | 19 | 25 |
| 2 | 12 | 16 | 27 | 7 | 10 | 22 | 28 | 6 | 15 | 23 | 29 | 4 | 13 | 21 | 30 |
| 0 | 15 | 18 | 29 | 6 | 8 | 23 | 24 | 0 | 8 | 18 | 24 | 3 | 11 | 17 | 26 |
| PASS NUMBER 14: $F_1$ | | | | | | | | PASS NUMBER 15: $F_1$ | | | | | | | |
| 1111 | | 1111 | | 1111 | | 1111 | | 1111 | | 1111 | | 1111 | | 1111 | |
| 6 | 15 | 23 | 30 | 7 | 14 | 22 | 31 | 3 | 11 | 19 | 27 | 7 | 15 | 23 | 31 |
| 4 | 13 | 21 | 29 | 5 | 12 | 20 | 28 | 2 | 10 | 18 | 26 | 6 | 14 | 22 | 30 |
| 3 | 11 | 18 | 26 | 2 | 10 | 19 | 27 | 1 | 9 | 17 | 25 | 5 | 13 | 21 | 29 |
| 0 | 8 | 17 | 24 | 1 | 9 | 16 | 25 | 0 | 8 | 16 | 24 | 4 | 12 | 20 | 28 |
| FINAL OUT SHUFFLE | | | | | | | |
| 1111 | | 1111 | | 1111 | | 1111 | |
| 3 | 7 | 11 | 15 | 19 | 23 | 27 | 31 |
| 2 | 6 | 10 | 14 | 18 | 22 | 26 | 30 |
| 1 | 5 | 9 | 13 | 17 | 21 | 25 | 29 |
| 0 | 4 | 8 | 12 | 16 | 20 | 24 | 28 |

The foregoing describes a preferred embodiment of our invention and is intended to be illustrative only. Our invention is susceptible of numerous modifications readily apparent from the above and is limited only as set forth in the claims which follow.

We claim:

1. Apparatus for sorting $2^v$ words, where v is an integer of value equal to or greater than k, comprising:

a programmed processor;

$2^k$ memory modules, where k is an integer of value greater than one, each comprising an input, an output, and means for storing $2^{v-k}$ words to be sorted;

$2^{k-1}$ means connected to the outputs of said memory modules for comparing a word in the Mth memory module with a word in the $M+2^{k-1}th$ memory module, for $0 \leq M < 2^{k-1}$, and for providing a first selected one of said words to a first output of said comparing means and for providing a second selected one of said words to a second output of said comparing means in response to first control signals from said processor;

$2^k$ switches, each having an output coupled to the input of a separate one of said memory modules, and a plurality of inputs coupled to the outputs of selected ones of said comparing means, said switches responding to second control signals from said processor for effecting interconnections between the outputs of said comparing means and the inputs of said memory modules according to an algorithm being processed by said processor and predetermined by the values of v and k.

2. The apparatus of claim 1, wherein said memory modules are serial shift registers.

3. The apparatus of claim 2, wherein said comparing means includes means for comparing the numerical values of two binary signals.

* * * * *